United States Patent [19]
Henneberry et al.

[11] Patent Number: 5,225,713
[45] Date of Patent: Jul. 6, 1993

[54] MOBILE SECURITY SYSTEM

[76] Inventors: Warren J. Henneberry, 555 Church St., Wallkill, N.Y. 12589; Stewart Settles, 100 Spring Ridge Pl., Roswell, Ga. 30076

[21] Appl. No.: 720,712

[22] Filed: Jun. 25, 1991

Related U.S. Application Data

[63] Continuation-in-part of Ser. No. 340,423, Apr. 19, 1989, abandoned.

[51] Int. Cl.⁵ .............................................. B60R 25/04
[52] U.S. Cl. .................................. 307/102; 307/10.3; 307/10.6; 340/426
[58] Field of Search ...................... 307/9.1, 10.1, 10.2, 307/10.3, 10.5, 10.6; 340/426; 379/37, 58, 59, 61, 62

[56] References Cited

U.S. PATENT DOCUMENTS

| | | | |
|---|---|---|---|
| 4,023,138 | 5/1977 | Ballin | 340/539 |
| 4,413,261 | 11/1983 | Greenber | 307/10.2 |
| 4,507,644 | 3/1985 | Abrahamson | 307/10.2 |
| 4,809,199 | 2/1989 | Burgess et al. | 307/10.2 |
| 5,000,139 | 3/1991 | Wong | 307/10.6 |
| 5,113,427 | 5/1992 | Ryoichi et al. | 307/10.1 |

*Primary Examiner*—Jeffrey A. Gaffin
*Attorney, Agent, or Firm*—John B. Hardaway, III; Jeffrey L. Wilson; J. Bennett Mullinax

[57] ABSTRACT

An apparatus is provided for preventing unauthorized operation of an engine of a motorized vehicle having a cellular telephone whereby certain DTMF tones must be generated on the cellular telephone prior to the engine of a motor vehicle being operational.

2 Claims, 3 Drawing Sheets

MOBILE SECURITY SYSTEM

CROSS REFERENCE TO RELATED APPLICATIONS

This application is a continuation-in-part application of Ser. No. 07/340,423, filed Apr. 19, 1989.

FIELD OF THE INVENTION

The present invention relates generally to security systems and, more particularly, to an apparatus and method for preventing theft or unauthorized use of a motor vehicle.

BACKGROUND OF THE INVENTION

Almost since the first development and use of mobile vehicles, theft and unauthorized use of such vehicles has been a serious concern to owners of the vehicles. Various different devices and systems have been heretofore proposed to combat the theft and unauthorized use problem. Generally, the object of the particular anti-theft device is to disable the engine of the motor vehicle and/or to produce an audible alarm to deter unauthorized users from utilizing the motor vehicle. Many of such systems require that the user enter a pre-set coded signal which either disengages the disabling device or prevents it from disabling the electrical system which it is designed to disable.

Some anti-theft systems utilize radio signals to activate or deactivate a mobile vehicle electrical system. U.S. Pat. No. 4,023,138 discloses a vehicle theft-prevention system which includes a receiver located in the vehicle which receives a signal from a remote transmitter. When the distance between the receiver and transmitter exceeds a predetermined amount such that the signal's strength at the receiver is less than a predetermined signal level, a control circuit is actuated which, upon actuation, may actuate an alarm and deactivate the vehicle ignition system so as to prevent further operation of the vehicle or both.

U.S. Pat. No. 4,413,261 discloses a coded control system for a vehicle ignition system which uses a self-contained radio transmitter unit for broadcasting a coded signal to a receiver/controller unit on the vehicle which is wired into the vehicle's engine ignition circuit.

Another security and anti-theft system discloses an apparatus for preventing theft or unauthorized use of an article such as a motor vehicle and prevents normal operation of the article unless electrical communication has been established between an exposed conductive element and a touch pole. That disclosure is made in U.S. Pat. No. 4,507,644. The disabling mechanism in this disclosure does not require the use of a coded signal to disengage the disabling system.

In recent years, increasing numbers of mobile vehicles have become equipped with cellular mobile telephones. Other electronic devices are also being added to mobile vehicles as additional tools for the traveling business person and as a convenience for the ordinary traveler. Prior to the subject invention hereinafter described, a security and anti-theft system has not been combined with and commonly controlled through a cellular mobile telephone by the disclosed means.

SUMMARY OF THE INVENTION

It thus an object of this invention to provide a security or anti-theft device which is reliable, reasonably priced and easily installed.

It is another object of this invention to provide a security or anti-theft device which can be controlled and is responsible to a predetermined sequence of sound tones such as that produced by the push buttons of a cellular telephone.

It is a further and more particular object of this invention to provide a security or anti-theft device which is capable of reading and responding only to the dual tone multi-frequency (DTMF) tones generated by a cellular phone for dialing in the land-based telephone network.

It is yet a further and more particular object of this invention to provide a security or anti-theft device which further activates lights and/or an audible alarm if any attempt is made to operate the motor vehicle without first deactivating the security system.

These as well as other objects are accomplished by the herein disclosed security or anti-theft device (hereinafter referred to as "device") which prevents unauthorized operation of the engine of a motorized vehicle which has an electric energy supply, a starter circuit and an ignition circuit. The device comprises a means for generating specified sound tones, a sound tone detector means for receiving the sound tones and a control circuit interposed into the ignition circuit and/or the starter circuit for opening and closing the ignition circuit and/or the starter circuit.

BRIEF DESCRIPTION OF THE DRAWINGS

FIG. 2b of the drawings are diagrams of a continued portion of the controlled circuit begun in 2a.

DETAILED DESCRIPTION

In accordance with this invention it has been found that a DTMF generator of a cellular automobile telephone may be utilized in conjunction with a security system so as to disable the automobile in the event of unauthorized use. Thus, in accordance with this invention, if an attempt is made to start the vehicle either by key or "hot wiring", the security portion of the device, through relay contact or other means, or both, will cause one or more of the electrical circuits (user selected) to become inoperative. In a preferred embodiment of the device if one of the electrical circuits becomes inoperative, the device will begin a timed delay which, if not cancelled, will activate an alarm circuit thereby causing an alarm to sound for a specified time period and/or simultaneously activate other systems, such as lights.

Various other advantages and features will become apparent from a reading of the following description given with reference to the various figures of drawing.

Figure 1:
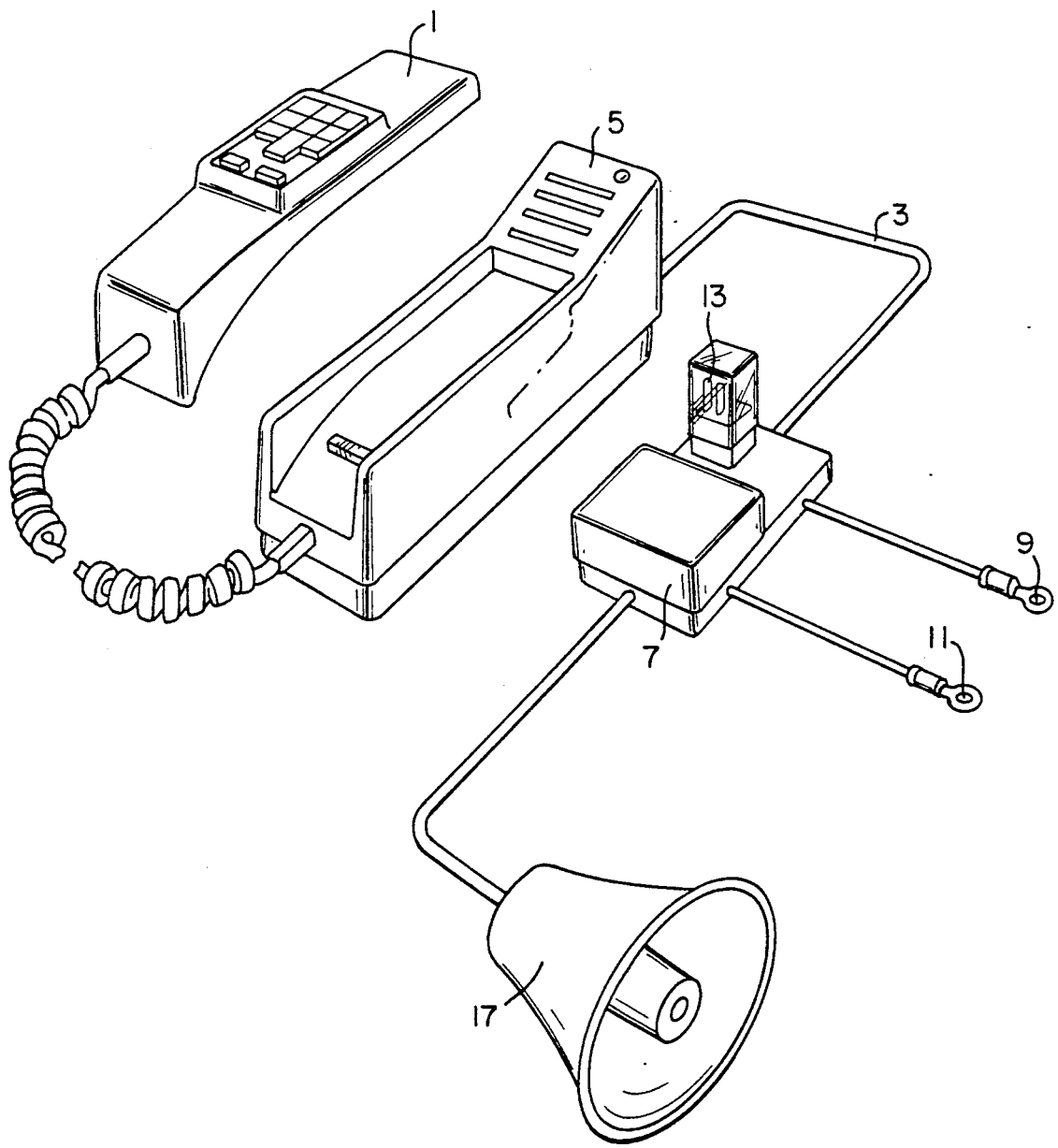
FIG. 1 of the drawings is a schematic diagram partly in block form of one embodiment of the mobile security system.

Referring to FIG. 1, a particular feature of this invention is the way in which it is controlled. A mobile cellular telephone 1 is attached within the vehicle by means of a cable 3 connected to the cellular telephone speaker 5. Circuitry 7 monitors the electrical activity occurring in the speaker 5. Circuitry 7 has no contact electrically or mechanically to any switch or keyboard contacts in the cellular telephone; nor does it respond to any digital information generated by the telephone for its internal functions. The only signals electrically monitored are those occurring in the speaker 5. In the preferred embodiment, only the DTMF tones generated by the cellular telephone 1 for dialing the land-based telephone network are read, decoded and compared with previously stored DTMF tones. These DTMF tones are the only means of control. A digital code is programed into the circuitry using the cellular telephone 1 during installation. When either the vehicle's starter circuit 9 or ignition circuit 11 is activated, the control circuit 7 activates the security functions, and the normally closed ignition contacts 13 and/or starter contacts are then opened. To deactivate the security control and allow the vehicle to operate normally, the preselected digital code previously programed must be entered in the correct sequence. Control circuit 7 contains additional circuitry to secure itself from incorrect codes or tampering.

Additional digital codes are programmed into the control circuit 7 which allow a standby or "valet" mode for vehicle service. This code is also entered through the cellular telephone 1. The circuitry 7 can also be reprogrammed at any time by use of the cellular telephone 1. The DTMF tones and code generated by the cellular telephone are the only means of controlling the mobile security functions.

The preferred embodiment of this invention has within the control circuit 7 means to activate an alarm circuit 17 if the connections to the cellular telephone are severed, the telephone is removed or an incorrect digital code is entered. When an attempt is made to start or operate the vehicle, the alarm circuit 17 will be activated after a predetermined time, unless the correct digital code is entered.

DESCRIPTION OF A PREFERRED CIRCUITRY

The cellular telephone unit has two main functions, i.e., to prevent the engine from starting unless a programmed four-digit code has been entered into the control circuitry via the cellular telephone handset and to sound an alarm if either the cellular phone has been disconnected from the circuitry 7 or an unauthorized attempt to start the vehicle takes place.

Figure 2A:
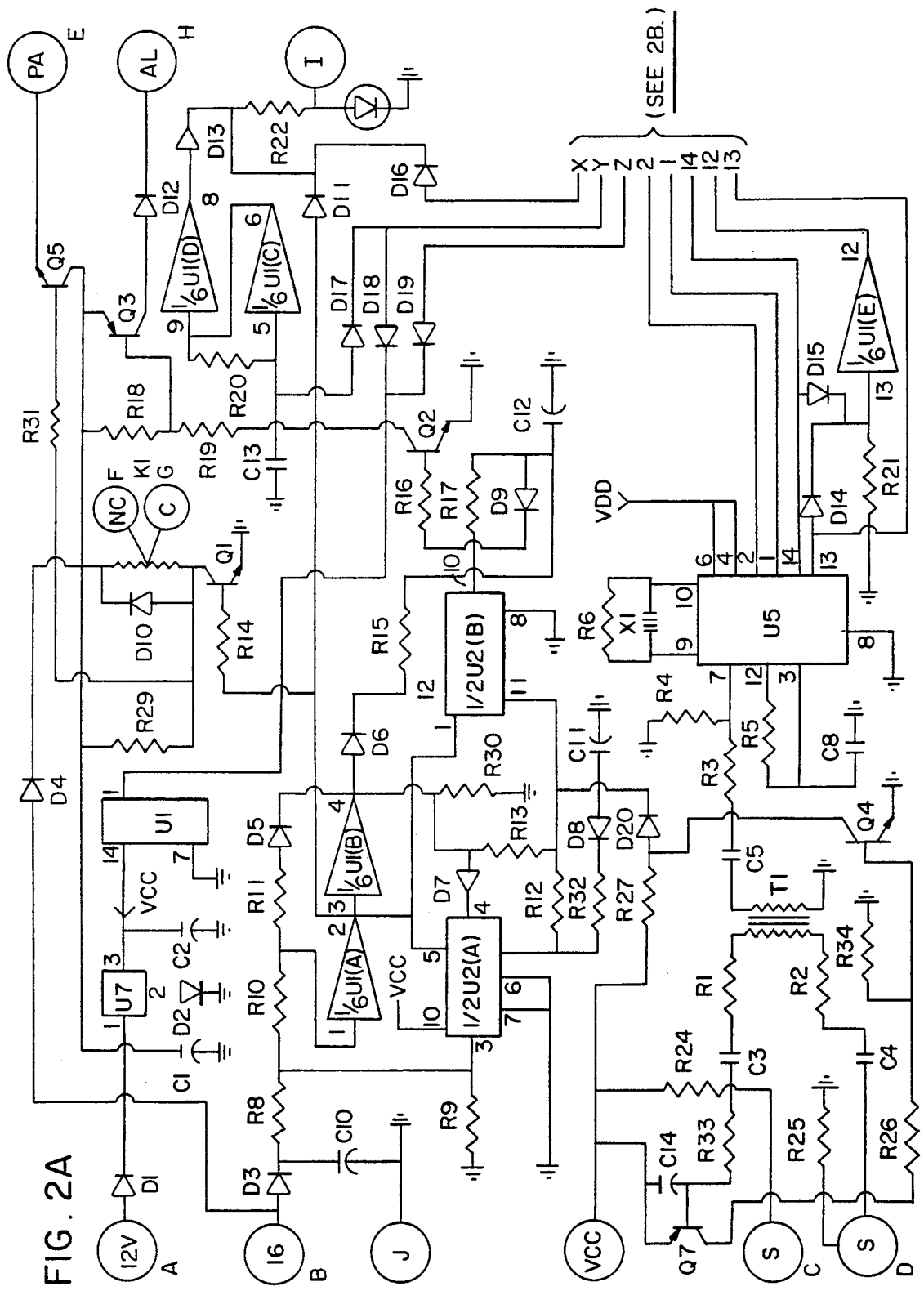
FIG. 2a of the drawings is a diagram of one embodiment of the control circuit.
Figure 2B:
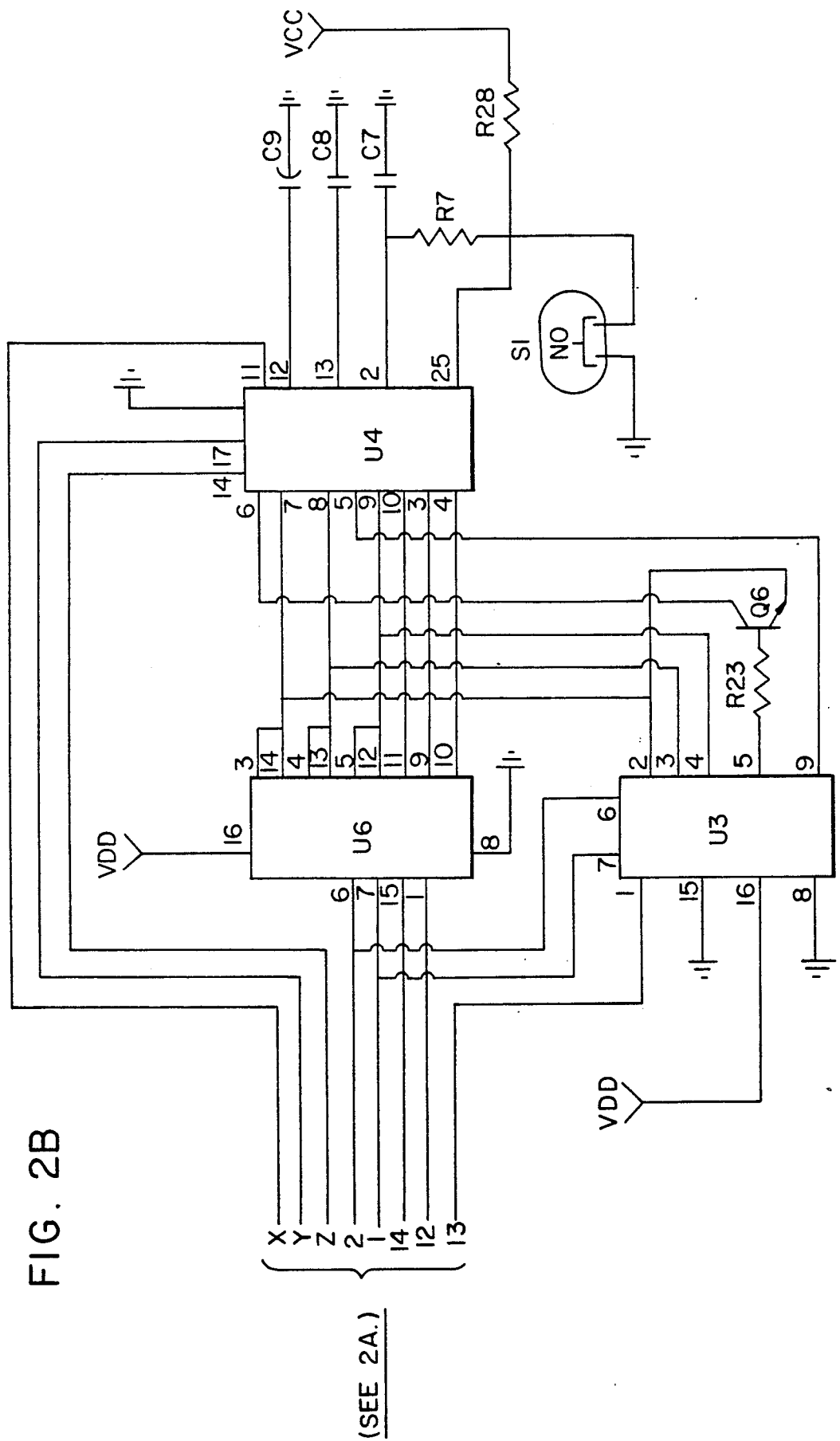

The functions of the elements in the schematic of FIGS. 2 and 2a are as follows. Individually, the elements serve special purposes. Collectively, they function as a security device. The first element in the schematic is the regulated power supply made up from components D1, C1, U7, an LM7805 5 V Regulator, D2, C2. They form a 5.6 V DC regulated supply which is derived from the cars' 12 V battery. The second element is the ignition sensing and arming circuit, made up of components D3, C10, R8, R9, R10, R11, D5, D6, D7 and two sections (A and B) of U1, a CD40106 Hex Schmitt Trigger.

When the ignition switch is turned on, C10 will charge through D3 to full battery potential +12 V DC and will remain there until the ignition switch is turned off. With a starting point of the latch circuit formed by two sections (A and B) of U1, R11 and D5, with pin 4 sitting high and pin 1 high through the ignition switch, the entire circuit would be in a disarmed condition. With the ignition switch off, C10 will discharge through R8 and R9 in approximately fifteen seconds. When a threshold voltage of approximately 2 volts is reached on C10, the latch circuit will switch pin 4 low, pulling pin 1 low through R11, D5 and will stay there (regardless of the ignition switch position) until D18 or D19 apply a high voltage generated from U4 to pin 1 of U1 to reset the latch circuit. At this time, the ignition disable elements are functional.

The ignition disable circuit is made up of D4, R14, D10, Q1, K1, R29, R31 and Q5. When pin 1 of the latch circuit was pulled low in the arming sequence, pin 2 went high. This in turn caused Q1 to switch on through R14. If the ignition switch is now turned on, D4 would apply current to the K1 coil, which would conduct through Q1, energizing K1 and opening a selected circuit through the relay contacts, disabling the vehicle. R29, R31 and Q5 form an auxiliary circuit to arm and disarm another alarm circuit. Q5 functions as a voltage follower which reflects the voltage appearing at the collector of Q1. The entry time circuit comprises section A of U2, a CD4013 BC, a dual D Flip Flop, D7, R12, R13, R30, R32, D8 and C11. Section A is enabled through the latching circuit action of U1 previously discussed. With the latching circuit in the armed or set condition, Section A of U2 can be triggered if the ignition switch is turned on. When this happens, section A of U2 is set, causing pin 1 to go high and begin charging C11 through R12. This takes approximately 20 seconds. This set condition of the first section can be cancelled by resetting the latching circuit, formed by U1 A and B. If it is not cancelled, the C11 charging will initiate the alarm sound timer section.

The alarm sound section is made up of U2(B), a second section of U2, R15, R16, R17, D9, C12, Q2, R19, R18, Q3 and D12. When C11 reaches a threshold voltage, section B of U2 is set through pin 11. Section A will reset itself through pin 4 and await another trigger pulse. With section B set, pin 13 goes high and begins charging C12 through R17. At the same time, Q2 switches on through R16 causing Q3 to switch on through R19. Q3 conducts battery voltage through D12 to an external siren. The siren will sound until C12 reaches the threshold voltage and will stop when pin 10 of U2(B) goes low. At any time this circuit can be reset through D6 by resetting the latch circuit U1(A) and (B).

Section (B) of U2 can also be triggered after the arming sequence by the speaker resistance measuring section, made up of R24, R25, R26, R27, C14, D2, Q4, Q7 and R33. With the cellular phone speaker connected between points C and D, a small current will flow into the base of Q7 through R32 switching it on, causing current to flow through Q4, in turn causing D20 to be nonconducting. Audio from the speaker is filtered by C14 and R33 to keep Q4 conducting under high audio signal conditions. If the speaker is disconnected from C or D, Q4 will have no base current and will switch off. This causes D20 to conduct through R27 and in turn cause the alarm sound section to function.

Speaker audio is coupled via C3, R1, C4, R2, T1, C5, R3 and R4 to DTMF decoding IC, U5, a Crystal Semiconductor CS-204 DTMF Receiver. U5 recognizes the DTMF tones generated by the cellular phone and converts them to binary (BCD) outputs. These outputs are connected to U3 and U6, both circuits being CD4529 BC Dual 4 Channel or single 8 Channel Analog Data Selectors. U3 and U6 in this instance are used to convert the BCD information from the outputs of U5 into switched pair outputs for each valid number decoded from the cellular phone by U5. U3 and U6 present analog switch closures to the inputs of U4 identical to the switch closures U4 requires from a keypad switch matrix for its proper function. The circuit formed by D15, D14, R21 and section (E) of of U1 selects which of U6 or U3 is active when U5 is receiving DTMF information so the proper outputs are generated to U4.

The storage and control element of the circuit is U4. U4 is an LSI Semiconductor LS7222 Keyboard Programmable Digital Lock Circuit. It has support components R28, S1, R7, C7, C8, C9, R23 and Q6. U4 is programmed when the device is installed in the vehicle by resetting the U4 memory through depression of S1. Now blank, the memory of U4 is programmed through the actions of the cellular phone, U5, U3 and U6. A four-digit code is entered to disarm the system. A four-digit code is entered to place the device in a standby or valet mode and a four-digit code is entered to reprogram U4 at any time. Upon receipt of a proper code, the action of U4 will reset all the arming and alarm circuits immediately through D18 and D19.

The last section to describe is the status circuit, which comprises two sections C, D of U1, R20, C13, D11, D13, D16, and R22. This circuit consists of an oscillator circuit, section (C) of U1, and an inverter, section (D) of U1. Section (D) can be put into any of three states by the conduction of currents through D11, D16, D17 and section (C). When the circuitry is disarmed, D17 is conducting, pulling pin 5 low and therefore 6 high. This in turn causes pin 8 to go low and no current flows through R22. Therefore, the LED connected externally from R22 to ground is off. When the device is armed, D11 is conducting as is D17. This D11 current will flow in R22. Therefore, the LED is on. When the circuitry 7 is in the standby or valet mode, D12 is no longer conducting and D11 is not conducting, so the oscillator circuit, section (C) of U1 will function, causing D13 to conduct when pin 8 is high. Therefore, the LED will blink. When the circuitry is being programmed, D16 is conducting and the LED will be on.

Together, the individual circuits form a protection for the vehicle and for the cellular phone, with the added features of nothing to carry and the flexibility to change control codes at any time.

It is thus seen that this invention provides security for an automobile having a cellular telephone therein. It is further seen that this invention incorporates the cellular telephone into the security of the automobile. As the above description is exemplary in nature and many variations will become apparent to those of the skill in the art, such variations are embodied within the spirit and scope of this invention as defined by the following appended claims.

What is claimed is:

1. In a motorized vehicle having an electric energy supply means, a starter circuit and an ignition circuit, the improvement comprising:

a cellular telephone which produces DTMF tones generated for dialing in the land-based telephone network;

a control circuit activated by closing of either the starter circuit or the ignition circuit electrically connected by wire to the speaker of the telephone having circuitry for monitoring the DTMF tones generated by the telephone and for decoding previously stored DTMF tones for opening and closing a circuit;

means for selecting the circuit to be controlled by the control circuit; and an alarm circuit activated by closing of either the starter circuit or the ignition circuit electrically connected by wire to the telephone and to the control circuit for activating an alarm upon entry of an incorrect code or severing or removal of the telephone.

2. The improvement according to claim 1 which further includes means for a timed delay after the ignition circuit or the starter circuit is opened before the control circuit is reactivated.

* * * * *